United States Patent [19]

Pelowski

[11] Patent Number: 4,560,936
[45] Date of Patent: Dec. 24, 1985

[54] PROGRAMMABLE CONTROLLER SYSTEM WITH FAILURE INDICATOR

[75] Inventor: Kenneth R. Pelowski, Farmington Hills, Mich.

[73] Assignee: Westinghouse Electric Corp., Pittsburgh, Pa.

[21] Appl. No.: 685,883

[22] Filed: Dec. 24, 1984

[51] Int. Cl.[4] .......................................... G01R 31/02
[52] U.S. Cl. ............................ 324/418; 324/73 AT; 324/424; 364/579; 364/580
[58] Field of Search ............... 340/653, 514, 515, 516; 324/51, 523, 538, 73 AT, 418, 421, 424; 364/579, 580

[56] References Cited

U.S. PATENT DOCUMENTS

| | | | |
|---|---|---|---|
| 2,432,092 | 12/1947 | Ferrell | 324/418 |
| 3,128,426 | 4/1964 | Swinehart | 324/421 |
| 3,515,982 | 6/1970 | Longworth et al. | 324/424 |
| 3,548,301 | 12/1970 | Zutkis | 324/418 |
| 3,745,453 | 7/1973 | Wright | 324/51 |
| 3,920,973 | 11/1975 | Avellar et al. | 364/579 |
| 4,177,419 | 12/1979 | Fiorentzis | 324/73 AT |
| 4,311,961 | 1/1982 | Holt et al. | 324/418 |
| 4,363,105 | 12/1982 | Plassmeier | 364/580 |
| 4,516,076 | 5/1985 | Pillari et al. | 324/418 |

Primary Examiner—James L. Rowland
Assistant Examiner—Daniel Myer
Attorney, Agent, or Firm—M. J. Moran

[57] ABSTRACT

A programmable controller system is taught which uses an oscillator to provide a relatively low frequency low duty cycle series of digital ones and zeros to the gate logic of a load control device regardless of whether the device is in the ON or OFF state. These signals are electrically passed through the system which controls the load for such a short time that the load cannot change state because of electrical momentum and/or inertia thereof. The series of digital ones and zeros nevertheless do pass through the system and sensing means serve to test the correct operation of the output devices. As long as the oscillator generated signals continue to pass through the gate, the capacitor controlled sensing devices will be held in a state such as to provide no indication of failure. The only time a failure indication will take place is if the latter signals do not make it through the array of electronic devices in which case the discharge or charging characteristics of the capacitor controlled sensing circuitry would eventually cause an indication of failure even though the load may remain unaffected. The system as taught gives an indication of failure when the next load state change is unlikely to occur because command signals therefore will not pass through the logic system.

2 Claims, 7 Drawing Figures

PROGRAMMABLE CONTROLLER SYSTEM WITH FAILURE INDICATOR

BACKGROUND OF THE INVENTION

The subject matter of this invention relates generally to programmable controller systems and relates more specifically to failure indicators for the same.

Programmable controller systems in general are well known. Examples of such systems may be found in the Westinghouse Descriptive Bulletin 16-354 entitled "Numa-Logic TM 700 and 900 Series Programmable Controllers", Apr. 4, 1983 and Descriptive Bulletin 16-355 entitled "Numa-Logic TM PC-1100 Programmable Controller", April 1983, both of which were published by the Westinghouse Electric Corporation (Industry Electronics Division), the assignee of the present invention. Generally, programmable controller systems of the type mentioned include a basic central processing unit which includes a microprocessor, power supply apparatus, and a databus. The CPU is typically usable with some form of programming device, e.g. a keyboard which may be disconnectably connected thereto for programming. Input/output cards are provided for utilization with the central processing unit for taking addressed data from the central processing unit and using that data to drive load devices such as relays and the like. Input/output cards may also perform input functions for the central processing unit, that is provide information about machine status to the central processing unit for subsequent utilization by the central processing unit for control of machine functions. An auxiliary peripheral cathode ray tube may be utilized, for example, in the programming operation for the programmable controller. The Programmable controller operates automatically to control relays, solenoids and other output devices in correspondence with predetermined program conditions, feedback from the devices and operating conditions associated with the devices.

Programmable controller systems usually have associated therewith indicating devices such as light emitting diodes or the like for providing an indication of the status of certain operations, or apparatus within the programmable controller. It would be desirable to provide an indicating device on an output card which provides an indication if an important portion of the electronic circuitry of the output card fails or is shorted out while the card is in place on line, in a real time operating situation in a card rack so that appropriate action can be manually or otherwise taken to safeguard the status of the load served by the card in question. It would be desirable if this could take place whether the load served thereby was in a non-energized or OFF state or in an energized or ON state. This would be especially helpful where the logic transfer elements within the card ceased to operate to pass logic signals within the card or if there was failure of an output switch.

SUMMARY OF THE INVENTION

In accordance with the invention, a switch system with failure indicator for controlling an electrical current-actuated load system which remains in a predetermined load state for a predetermined minimum time after the electrical current therefore ceases to flow and which changes load state after said minimum time unless said current is earlier reapplied, is taught. This includes a switch means with a control terminal interconnectable with the load system and with a power supply for causing electrical conduction in the load system when turned on and for causing said conduction to cease when turned off. The switch means has a test terminal on which exists a first voltage level when the switch means is on, and a second voltage level when the switch means is off. There is also provided a control means which is interconnected with the control terminal for causing the switch to deliberately turn on and off as desired without effecting the status of the load interconnected therewith because of the mechanical momentum or inertia of the load. There is provided a simulating means which is interconnected with the control terminal for providing a periodic overriding off signal of predetermined duration and predetermined repetition when the switch is on and vice-versa. The predetermined duration is less than a predetermined minimum time delay so that the load system will stay in the same mechanical state even though the current has been discontinued for a short period of time. There is provided a failure detector means which includes capacitive means with charging path and discharging path, each of which are interconnected with the test terminal. The capacitive means is interconnected with a voltage sensitive indicator means which provides a fault indication if the voltage on the capacitive means obtains a predetermined value. The capacitive means is charged through the charging path towards the predetermined voltage value from the test terminal when the first voltage level is on the test terminal and is discharged generally instantaneously to the test terminal when the second voltage level is on the test terminal. The time constant of the charging path relative to the period between each said periodic overriding off signal is such that the predetermined voltage value for the voltage sensitive indicator is not normally reached because the capacitive means is discharged each time unless the controllable switch means does not correspondingly switch off at the beginning of each said periodic off signal. In the latter case the capacitive means will not be fully discharged thus causing the voltage value for the voltage sensitive indicator to be obtained, thus causing the indicator to indicate a failure.

The apparatus taught with respect to the embodiments of this invention have many advantages. One advantage lies in the fact that the logic circuit load status may be continuously tested whether the load is energized (on) or not (off) by the utilization of a periodic low duty cycle, long period signal which pulses a significant portion of the logic system to determine if a failure has taken place. If the failure has taken place, that is if a load which is on is predetermined not to be able to be turned off, or a load which is off is predetermined not to be able to be turned on, appropriate action may be taken by an operator to replace the card or otherwise keep the load under control.

BRIEF DESCRIPTION OF THE DRAWINGS

For a better understanding of the invention, reference may be had to the preferred embodiment thereof shown in the accompanying drawings in which.

DESCRIPTION OF THE PREFERRED EMBODIMENTS

Figure 1:
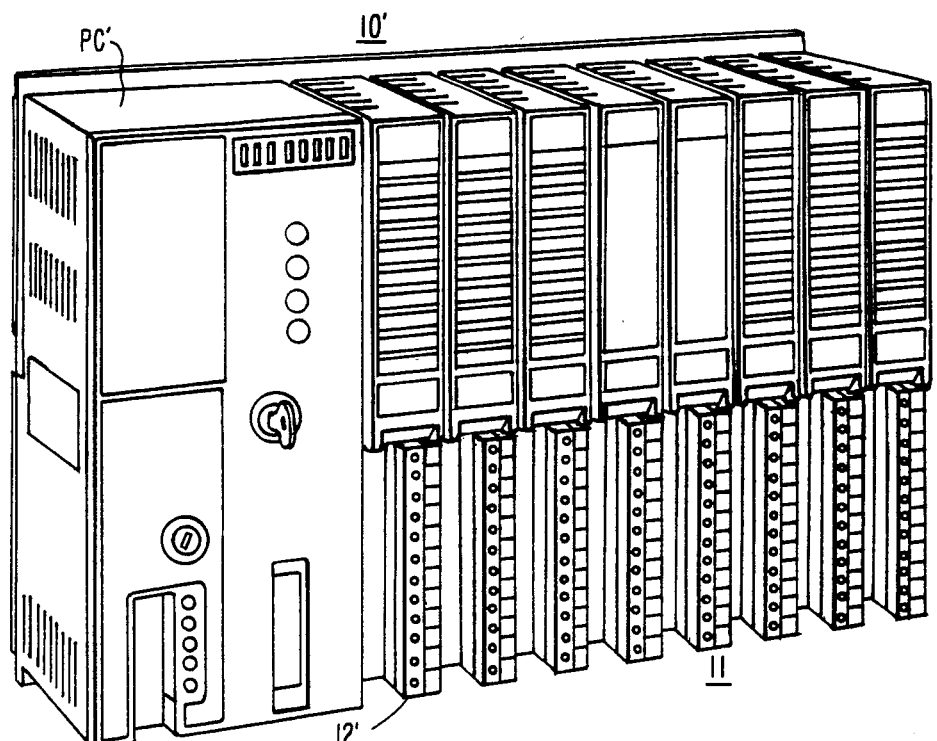
FIG. 1 shows an orthogonal view of a prior art programmable controller system which may be changed to utilize the present invention.

Referring now to FIG. 1, a prior art programmable controller system 10' is depicted. This system is described in the aforementioned Westinghouse Electric Corporation Descriptive Bulletin 16-355 entitled "Numa-Logic TM PC-1100 Programmable Controller" dated April, 1983. The prior art programmable controller system 10' of FIG. 1 includes a programmable controller PC' and a plug-in circuit card system 11 shown in the lower right portion of FIG. 1. A small portion of an exemplary prior art plug-in card 12' is shown. The portion of card 12' shown in FIG. 1 may be physically indistinguishable from the card described with respect to the preferred embodiment of the present invention shown in FIGS. 2, 3 and 4 herein. It is to be understood, therefore, that in the depiction of FIG. 1 card 12' does not include all the apparatus of the present invention. Rather, card 12' may be withdrawn and replaced with a plug-in circuit board input/output card 12 such as shown schematically in FIGS. 2, 3 and 4 which does embody the teachings of the present invention and which may cooperate with a similar programmable controller PC and a new programmable controller system 10 to provide an entirely new and useful programmable controller system.

Figure 2:
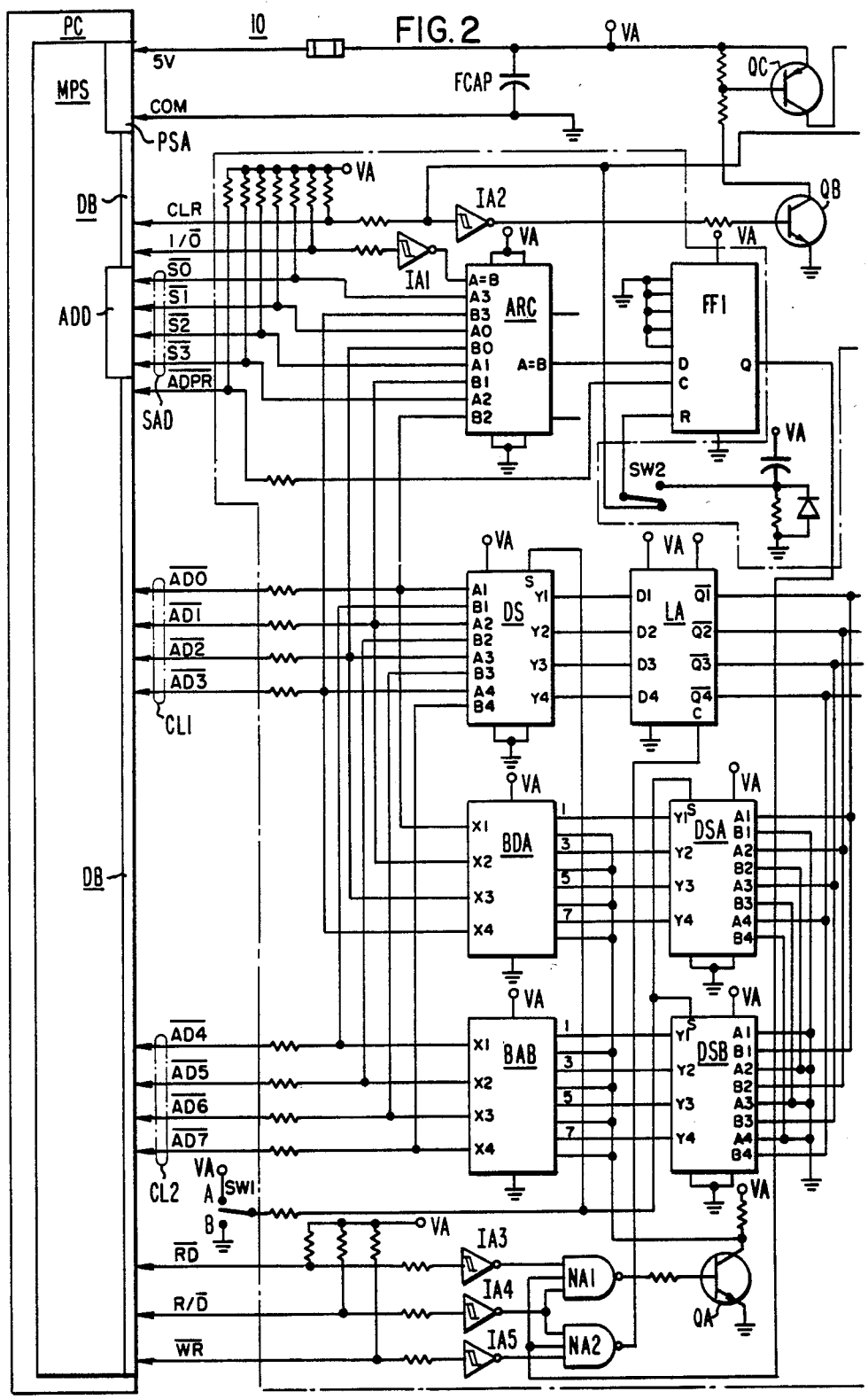
FIG. 2 shows a portion of the electrical apparatus of the present invention partially in block diagram form and partially in circuit diagram form.
Figure 3:
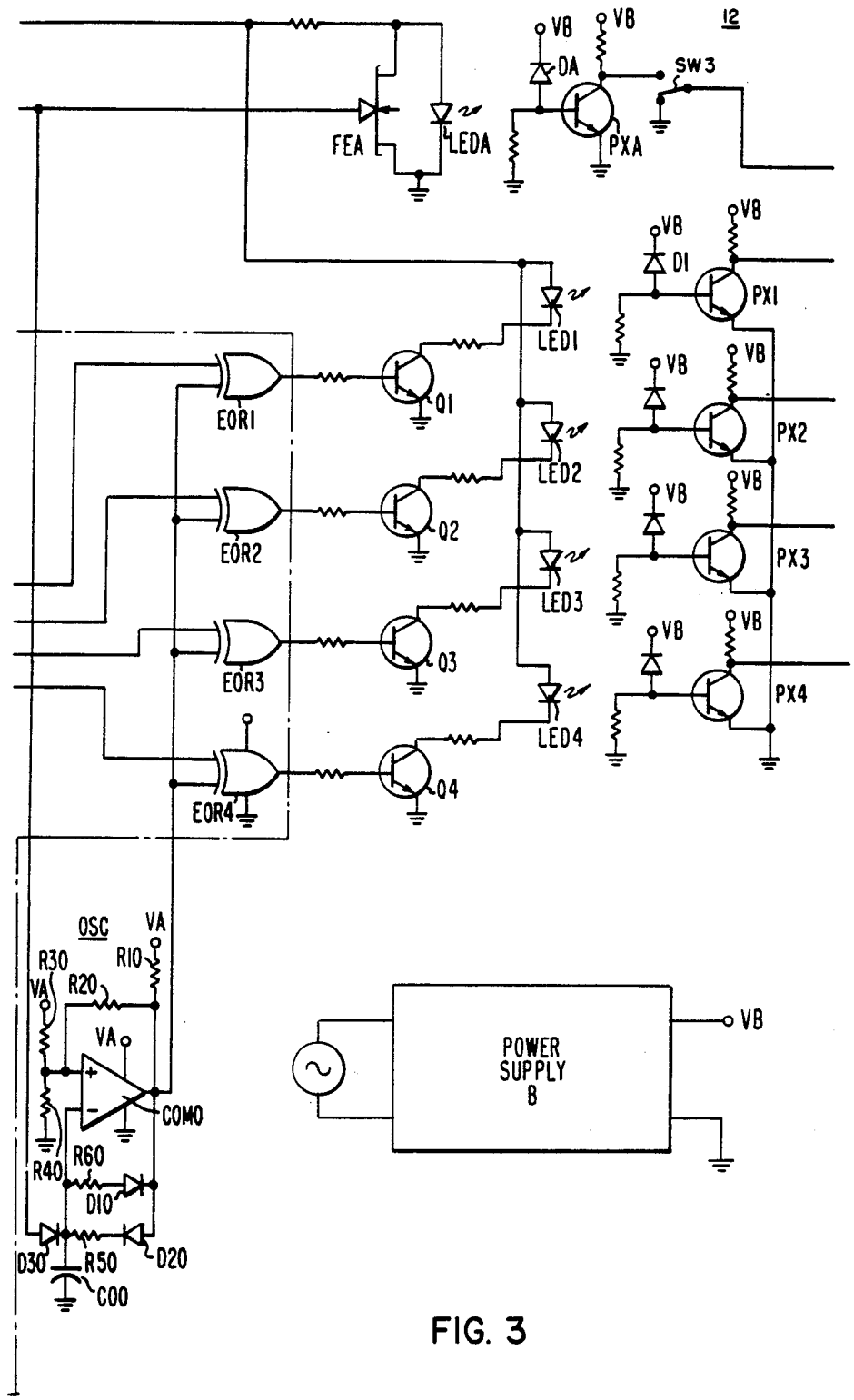
FIG. 3 shows a second portion of the invention described with respect to FIG. 2.
Figure 4:
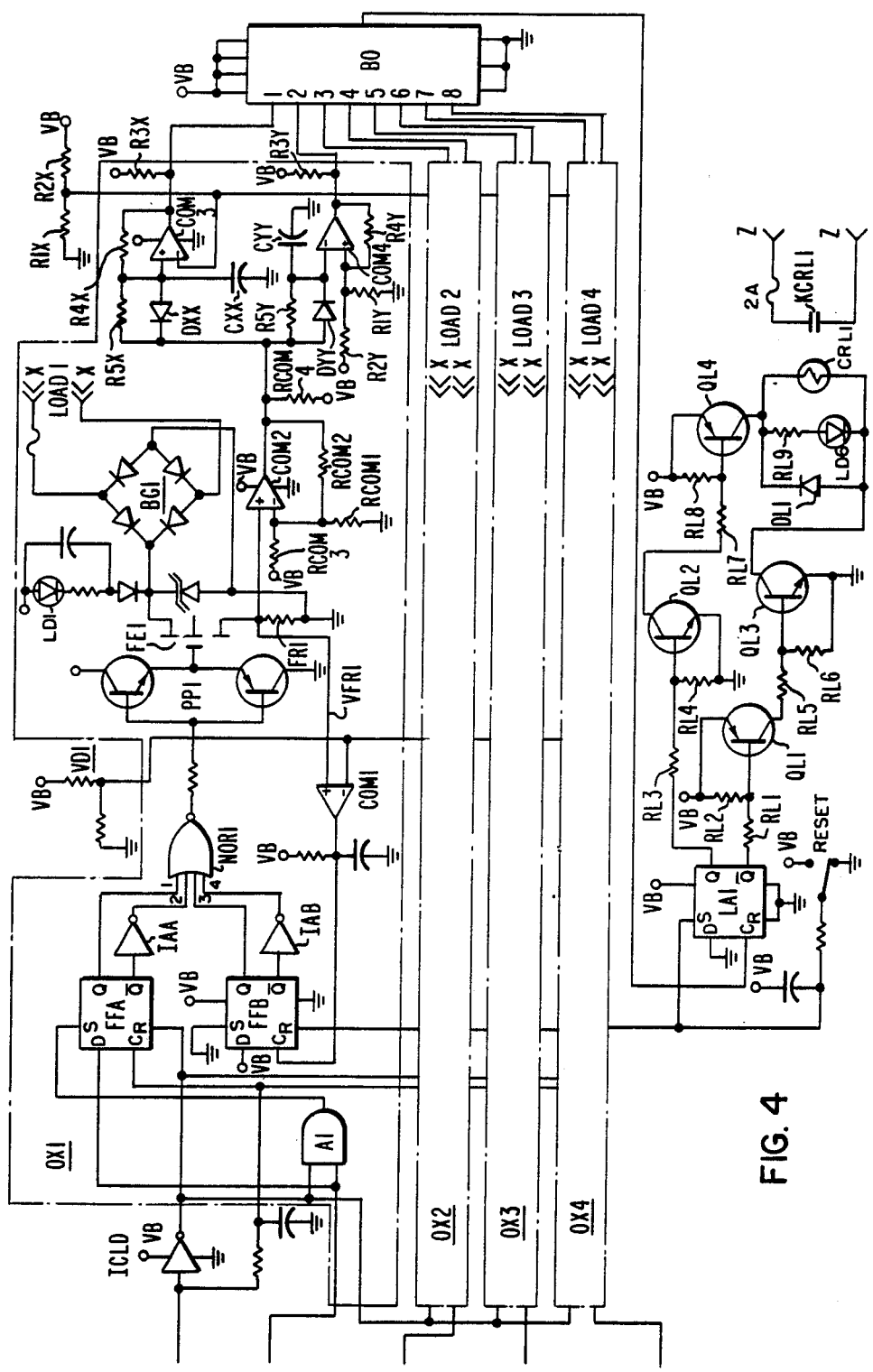
FIG. 4 shows a third portion of the invention described with respect to FIGS. 2 and 3.

Referring now to FIGS. 2, 3 and 4 in combination, a depiction of a programmable controller system 10 with programmable controller PC utilizing an electric circuit card 12 of the type embodying the teachings of the present invention is shown. The programmable controller PC is shown to the left. Part of the programmable controller PC may include a microprocessor system MPS which supplies digital signals to a data bus DB in response to a predetermined program. A system power supply PSA may also be included. In the preferred embodiment of the invention, the card 12 may be interconnected with the programmable controller PC such that disconnectable terminals thereof interconnect with appropriate terminals or lines on the data bus DB, an address location module ADD, and the system power supply PSA. In the preferred embodiment of the invention, power supply PSA may interconnect with the circuit card 12 in such a manner as to provide a voltage source VA and system voltage common COM. In the preferred embodiment of the invention voltage VA may be 5 volts DC. The voltage VA is routed through the circuit card 12 where appropriate as shown. The address location module ADD may be either hard-wired into the card rack for card 12 or switchably disposed in that card rack for providing a switch-selectable address SAD to the card 12. The purpose and use of a switch-selectable address SAD will be described hereinafter. The data bus DB may provide certain appropriate digital signals including address and data signals to the card 12 for instructing the card 12 to perform certain operations with respect to a load LOAD1, for example, in correspondence with decisions made within the microprocessor system MPS.

Figure 5A:
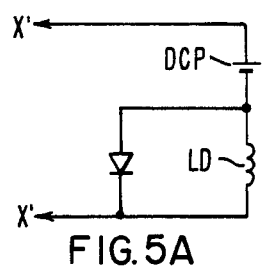
FIGS. 5A–5C show load arrangements for the electrical apparatus of FIGS. 2–4.
Figure 5B:
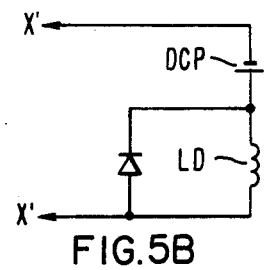
Figure 5C:
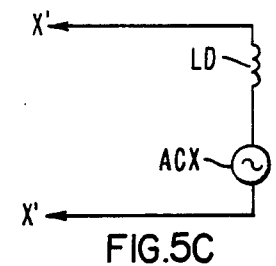

The "selectable" address SAD represents a cluster of four bits of digital data designated $\overline{S0}$, $\overline{S1}$, $\overline{S2}$ and $\overline{S3}$. This information is provided to give the card 12 an address of its own so that when separate address information from the microprocessor system MPS is provided on the data bus DB in a manner to be described hereinafter, the specific card 12 will recognize when it is being summoned for use by the microprocessor MPS. The card 12 may be known as an input/output or I/O module. In the preferred embodiment of the invention depicted in combined FIGS. 2, 3 and 4, the card 12 primarily performs an output function on the load LOAD1 at the terminals XX. Load LOAD1 may be represented by any of the load arrangements shown in FIGS. 5A, 5B and 5C, for example.

Address and data information are provided to the card 12 through the data bus DB by way of the input lines or data paths $\overline{AD0}$, $\overline{AD1}$, $\overline{AD2}$, $\overline{AD3}$. The latter-mentioned data paths are identified by the cluster designation CL1. A second cluster CL2 identifies four further parallel input data paths identified $\overline{AD4}$, $\overline{AD5}$, $\overline{AD6}$, $\overline{AD7}$. There are also provided on the data bus DB: (1) a clear signal CLR for clearing the card 12 at appropriate times, (2) an input/output signal I/O for designating whether the addressed card 12 is to perform an input or output function, (3) a read signal $\overline{RD}$ to designate when the card 12 is to send data back to the PC, (4) a write signal $\overline{WR}$ to designate when the programmable controller PC is to write data to the card 12 through the clusters CL1 and CL2, (5) a line designated R/$\overline{D}$ to insure that the data to the card will be of the discrete type mode, register/discrete being two types of data handled by the PC, and (6) an address present line $\overline{ADPR}$ to alert card 12 that an address is present in the cluster CL1. When the card 12 is plugged into the programmable controller PC, the address information on the four parallel lines $\overline{S0}$, $\overline{S1}$, $\overline{S2}$, $\overline{S3}$ is disposed upon the terminals A3, A0, A1 and A2 respectively of an address recognition circuit ARC which may, in a preferred embodiment of the invention, be an integrated circuit chip of the type designated MC14585BCP. Card address information from the microprocessor system MPS is provided by way of the four-bit cluster CL1 to the card 12. The four-bit parallel digital signals $\overline{AD0}$, $\overline{AD1}$, $\overline{AD2}$, $\overline{AD3}$ are provided to the input terminals B2, B1, B0 and B3 respectively of the aforementioned address recognition circuit ARC. The input/output signal I/O is provided by way of an inverting amplifier IA1 to the A=B terminal of the address recognition circuit ARC. When the aforementioned line I/O is energized, such that the A=B input terminal of the address recognition circuit ARC has a digital one thereupon, the address recognition circuit ARC compares the digital status of the A terminals thereof and the B terminals thereof to see if there is a terminal-set per terminal-set match, that is, does the digital signal on A3 equal the digital signal on B3 etc. If such is the case, that means that the microprocessor MPS by way of cluster CL1 has addressed card 12. When the address present signal A=B goes high, a digital one will be transferred to the D input terminal of a flip-flop FF1. The Q output terminal thereof enables NAND gates NA1 and NA2 for performing a subsequent read or write function in correspondence with the appropriate signals on the data bus DB. When the R/$\overline{D}$ line is energized, NAND gates NA1 and NA2 will be further enabled by way of inverting amplifier IA4. It is to be noted that there is a switch SW1 which may be placed in either the A position or B position. This switch is utilized to alert three digital blocks designated DS, DSA and DSB to read either the A input terminals thereof or the B input terminals thereof in correspondence with the setting of the switch SW1. This is done because eight bits of data represented by clusters CL1 and CL2 are available for input to the card 12, but only four bits of data are usable at one time by the card 12 in its present form. The user of the card 12 may determine which four bits are to be utilized. The four bits correspond to four separate card outputs LOAD1, LOAD2, LOAD3 and LOAD4 (the latter three not being shown). Presuming that the CL1 cluster is to be utilized, the switch SW1 is thrown to the A position. If the CL2 cluster is to be utilized, the switch SW1 will be thrown to the B position. When the switch SW1 is in the A position, the data selector DS reads the digital signals on the A1, A2, A3 and A4 input terminals thereof and passes that information to the Y1, Y2, Y3 and Y4 output terminals thereof respectively. That information is then sent to the D1, D2, D3 and D4 input terminals of a latch LA. When the write signal $\overline{WR}$ is present, the NAND gate NA2 is actuated to provide a clock signal to the C input terminal of data latch LA thus activating inverted output signals $\overline{Q1}$, $\overline{Q2}$, $\overline{Q3}$, and $\overline{Q4}$, respectively, corresponding logically to the previously mentioned input terminals D1-D4. It is to be understood that the presence of a digital zero on the input line $\overline{AD0}$, for example is indicative of a turn-on control action for LOAD1 which will be described in more detail hereinafter, while the presence of a digital one on the aforementioned line $\overline{AD0}$ is indicative of a turn-off control action, for example, for LOAD1. The digital zero is inverted to a digital one by the $\overline{Q1}$ output so that appropriate further circuit action may take place. The same may be said for the other input signals $\overline{AD1}$-$\overline{AD7}$. In the example described previously where the switch SW1 is disposed in the A position, thus utilizing the input line cluster CL1, a data selector DSA, similar to data selector DS, and a bus driver BDA are utilized in sequence to sense/drive inverse signals from/to the cluster CL1 at lines $\overline{AD0}$, $\overline{AD1}$, $\overline{AD2}$, $\overline{AD3}$ for writing/reading by the microprocessor system MPS during a complete cycle to verify that card 12 has been properly programmed. When the read line $\overline{RD}$ is appropriately energized, the NAND gate NA1 turns on a transistor QA which ensures that the non-used input terminals on the bus driver BDA are placed at a digital zero state thus enabling an output signal to the cluster CL1. It is to be understood, of course, that if the switch SW1 is placed in the B position, the cluster CL2 is read on the B input terminals of the data selector DS, passed through the latch LA during the presence of an appropriate write signal $\overline{WR}$, fed to the data selector DSB and provided as an output by way of bus driver BAB to cluster CL2 during the presence of an appropriate read signal $\overline{RD}$. The digital ones and digital zeros represented on the $\overline{Q1}$-$\overline{Q4}$ terminals of the output latch LA are provided to input terminals of exclusive OR gates EOR1, EOR2, EOR3 and EOR4, respectively.

For purposes of simplicity of illustration, the feeding of a single signal represented by data input AD0 for control of load LOAD1 will be described hereinafter; it being understood that signals represented by $\overline{AD1}$, $\overline{AD2}$, $\overline{AD3}$ for cluster CL1 or $\overline{AD4}$-$\overline{AD7}$ for cluster CL2 operate in the same manner. Presuming for the present that a digital one on the input of the exclusive OR gate EOR1 will provide a digital one on the output thereof and a digital zero on the input will provide a digital zero on the output thereof, the transistor Q1 will be turned on to thus energize the light emitting diode LED1 if a digital one is present at the $\overline{Q1}$ output of the latch LA. If that happens, the photo-transistor PX1 will be turned on thus grounding or placing a digital zero on the corresponding input of the AND gate A1. Conversely, if the signal $\overline{Q1}$ is zero, the output of the exclusive OR gate EOR1 will be zero, the transistor Q1 will be turned off, the light emitting diode LED1 will not be energized and the phototransistor PXI will be turned off, thus placing a digital one on the aforementioned terminal of the AND gate A1. A digital zero on the aforementioned input terminal of the AND gate A1 is indicative that the load LOAD1 should be energized. A digital one on the input terminal of the AND gate A1 is indicative that the load LOAD1 should be de-energized. Flip-flop FFA, like flip-flop FFB which will be described hereinafter, has the following characteristics. If the set S and reset R terminals thereof both have digital zeros disposed thereon, then at the occurence of a clock pulse on the input C, the Q output will be one and the $\overline{Q}$ output will be zero if a digital one exists on the D input. Conversely, if a digital zero exists on the D input, then the existence of a one of the clock terminal C will cause the $\overline{Q}$ terminal to have a digital one thereupon and the Q terminal to have a digital zero thereupon. On the other hand, if the set S input terminal is made high by the placement of a digital one thereupon, the Q terminal will have a digital one thereon and the $\overline{Q}$ terminal will have a digital zero thereon. But if the reset terminal R has a digital one thereon, then the $\overline{Q}$ terminal will have a digital one thereon and the Q terminal will have a digital zero thereon. Finally, if both the set S and reset R terminals are made high, both the Q and $\overline{Q}$ terminals will have a digital one thereupon. Presuming therefore that the output of the clear line driver ICLD is a digital one, thus placing a digital one on the reset terminal R, if the set terminal is zero the $\overline{Q}$ terminal will be one and the Q terminal will be zero. However, if the S terminal goes high, as will be the case if the output of the AND gate A1 is a digital one, then both the Q and $\overline{Q}$ terminals will be ones. Since the output of the $\overline{Q}$ terminal is inverted, this guarantees that at least two of the input terminals for the NOR gate NOR1 will be different. This guarantees that the output of the NOR gate NOR1 will be a digital one, which will energize the push-pull amplifier PP1 to cause the field effect transistor FE1 to conduct to thus complete the circuit between the load power supply and the load 1 at terminals XX of the bridge BG1. The way that the AND gate A1 has a digital one on the output thereof is if the lower input terminal has a digital one thereon. The condition for that was described herein previously.

The clear line CLR feeds the input of an inverting amplifier IA2 and the gate of a field effects transistor FEA. The output of the inverting amplifier IA2 is provided to the base of a transistor QB, the emitter of which is grounded and the collector of which feeds the base of a transistor QC, the emitter of which is connected to the voltage source VA and the collector of which is connected to the source of the previously mentioned field effects transistor FEA by way of a resistive element. A light emitting diode LEDA is connected between the source and drain of the field effects transistor FEA. The collector of the aforementioned transistor QC is also connected to all of the anodes of the previously mentioned light emitting diodes LED-1-LED4. The clear line CLR is also connected to an oscillator OSC for disabling it in a manner to be described hereinafter. The light emitting diode LEDA optically communicates with the base of a phototransistor PXA, the emitter of which is grounded and the collector of which is interconnected with a voltage source VB (from Power Supply B, shown in FIG. 3) by way of a resistive element. There is provided a last-valid-state switch SW3 the wiper of which may be connected to system ground or to the collector of the aforementioned phototransistor PXA. The output or wiper terminal of the switch SW3 is connected to clear line driver ICLD and by way of a resistor to the clock terminal C of a flip-flop FFA. The output of clear line driver ICLD is connected to the reset terminal R of flip-flop FFA. If the wiper of switch SW3 is disposed in the ground disposition, the circuit OX1 including the AND gate A1, the flip-flop FFA, the clear line driver ICLD, and the NOR gate NOR1 will operate in a manner to be described hereinafter. If, on the other hand, the wiper of the switch SW3 is disposed in the position which interconnects it with the collector of the phototransistor PXA, then the aforementioned circuit OX1 may operate differently depending upon whether a digital zero or digital one is imposed upon the wiper of switch SW3 by the clear line CLR. If the clear line CLR is at a digital one state indicating a desire for a clearing operation with respect to the card 12, the gate of the field effects transistor FEA will be energized. However, inverting amplifier IA2 will have a digital zero at the output thereof thus turning the transistor QB off, thus turning the transistor QC off, thus deenergizing the light emitting diode LEDA. If the light emitting diode LEDA is off, the phototransistor PXA will be off and a digital one will be imposed upon the wiper output of the switch SW3. This will place a digital zero on the reset terminal R of the flip-flop FFA. Regardless of the status of the S, D, or C terminals of the flip-flop FFA, if the reset terminal R is at digital zero, then the Q and $\bar{Q}$ outputs thereof will be in different digital status, i.e. one will be at a digital one state and the other will be at a digital zero state. Since these digital status are different, at least one input to the NOR gate NOR1 will be a digital one, which means the output of the NOR gate NOR1 must be zero. This has the effect of turning the push/pull amplifier PPI off, thus deenergizing the field effects transistor FE1, thus interrupting the current in the bridge circuit BG1 so that no load current may flow in the load LOAD1. Therefore, the effect of a reset signal, (digital one), on the clear line CLR is to turn the load LOAD1 off. Had a digital zero been present on the line CLR, then the output wiper of the switch SW3 when disposed in a state of interconnection with the collector of the phototransistor PXA would be zero, thus providing the same output condition for the circuit OX1 and the load LOAD1 as when the switch SW3 is grounded. In addition, if the reset terminal R of the flip-flop FF1 is interconnected by way of switch SW2 with the clear line CLR, the presence of a digital one on that line will cause the flip-flop FF1 to reset so that the Q output terminal is at zero, thus disabling the NAND gate NA1 and the NAND gate NA2 and preventing the read and write operations described previously until the reset or clear function on the clear line CLR is removed.

Referring specifically now to the flip-flops FFB shown in FIG. 4, it should be noted that the latter-mentioned flip-flop may essentially be the same as the previously mentioned flip-flop FFA in construction and operation. In the case of the flip-flop FFB, the set terminal S thereof is grounded. The reset terminal R is interconnected by way of a resistor to a reset switch RESET. The data terminal D is connected to power supply voltage VB and the clock terminal C is interconnected with the load circuit in a manner to be described hereinafter. To be more specific, there is provided a resistive element FR1 which is interconnected with field effect transistor FE1 and the bridge BG1 in such a manner as to conduct the load electrical current from load LOAD1, for example, therethrough and develop a related voltage VFR 1 thereacross when a current is flowing in the load LOAD1. The bottom of the resistive element FR1 is grounded and the top is connected to the plus terminal of a comparator COM1, the negative terminal of which is interconnected by way of voltage divider VD1 with power supply voltage VB. The values of the resistors of the voltage divider VD1 are such that the voltage on the negative terminal of the comparator COM1 is at a relatively low value. The value of the resistive element FR1 is chosen such that if the current flowing through the load LOAD1, through the diodes of the bridge BG1, and through the source-to-drain circuit of the field effects transistor FE1 is of an undesirably high value, the voltage VFR1 will increase to a level above that on the negative terminal of the comparator COM1 thus causing the output of the comparator COM1 to change from a zero state to a one state. When this happens, the clock terminal C of the flip-flop FFB will be changed to a digital one state thus causing the digital value on the input data terminal D thereof to be transferred to the Q output terminal thereof. Since the data terminal D is interconnected with the power supply voltage VB, a digital one exists thereupon. This digital one is transferred to the Q output terminal of the flip-flop FFB. This, therefore, puts a digital one on the number 3 input terminal of the NOR gate NOR1 thus causing the output of the NOR gate NOR1 be zero. If the output of the NOR gate NOR1 is zero, the push-/pull amplifier PPI is turned off, thus turning off the field effect transistor FE1, thus opening the circuit which includes the load LOAD1. The net effect, therefore, of the interconnection of the flip-flop FFB with the resistive element FR1 is to cause the circuit including those two elements and the NOR gate NOR1 as well as the push/pull amplifier PPI, the field effects transistor FE1, the bridge circuit BG1 and the load LOAD1 to cooperate in such a manner as to form a solid-state circuit breaker. When the load current, that is the current flowing through the resistive element FR1, exceeds a predetermined value, the load LOAD1 is turned off or disconnected automatically.

SELF-CHECKING FEATURE

Referring now to FIG. 3 there is shown an oscillator OSC which may be of any convenient design but which in the preferred embodiment of the invention is the type depicted in FIG. 3. There is provided a comparator COMO having plus and minus input terminals and an output terminal which is interconnected with the second or lower input terminals of each of the exclusive OR gates EOR1–EOR4 as shown in FIG. 3. There is also provided a resistive element R10, the upper part of which is connected to the power supply voltage VA, and the lower part of which is connected to one side of a resistive element R20 and the output of the comparator COMO. The other side of the resistive element R20 is connected to the positive input terminal of the comparator COMO. Also connected to the positive input terminal of the comparator COMO is one side each of a resistive element R30 and a resistive element R40. The other side of the resistive element R30 is connected to the power supply voltage VA and the other side of the resistive element R40 is connected to the system ground thus forming a voltage divider between the resistive elements R30 and R40. Also connected to the output of the comparator COMO is the cathode of a diode D10 and the anode of a diode D20. The cathode of the diode D20 is connected to one side of a resistive element R50 and the anode of the diode D10 is connected to one side of a resistive element R60. The other side of the resistive elements R50 and R60 are connected together and to the negative input terminal of the comparator COMO. Also connected to the aforementioned negative input terminal is one side of a capacitive element COO and the cathode of a diode D30, the anode of which is connected through a resistor to the clear line CLR. The other side of the capacitive element COO is connected to system common. In a preferred embodiment of the invention, the values for the various elements of the oscillator OSC are as depicted in Table 1 below:

TABLE I

| Element Nos. | Values |
| --- | --- |
| R10 | 3.3K ohms |
| R20 | 100K ohms |
| R30 | 100K ohms |
| R40 | 100K ohms |
| R50 | 1.2K ohms |
| R60 | 1 megohm |
| COO | 1 microfarad |
| COMO | LM 293 or equiv. |
| D10-D30 | IN4148 or equiv. |

In a preferred embodiment of the invention, the oscillator OSC is of the type which operates at a frequency of approximately 1 HZ with an uneven duty cycle producing an output pulse of approximately 1 millisecond duration every second.

Referring now to FIG. 4, another portion of the self-checking circuit is described. In particular, there is a comparator COM2 which is powered by the VB power supply. Connected to the positive input terminal of the comparator COM2 is the upper side of the previously mentioned resistor FR1, which in a preferred embodiment of the invention, may be a 1 ohm precision resistor. Connected to the negative input terminal of the comparator COM2 are one side each of three resistive elements RCOM1, RCOM2 and RCOM3. The other side of the resistive element RCOM1 is connected to system ground. The other side of the resistive element RCOM2 is connected to the output of comparator COM2. The other side of the resistive element RCOM3 is connected to the VB voltage supply. Also connected to the output of the comparator COM2 is one side of a resistive element RCOM4, the other side of which is also connected to the VB voltage supply. In a preferred embodiment of the invention, the value for the appropriate elements are as described below in Table 2:

TABLE 2

| RCOM1 | 39 ohms or 150 ohms |
| --- | --- |
| RCOM2 | 1 megohm |
| RCOM3 | 100K ohms |
| RCOM4 | 3.9K ohms |

The output of the comparator COM2 is connected to two capacitor regulating networks. There is provided a resistive element R1X which is interconnected with a resistive element R2X. The common junction between them is connected to the negative input terminal of a comparator COM3. One side of the resistive element R1X is connected to system ground and the other side of the resistive element R2X is connected to the VB supply voltage. Connected to the output terminal of the comparator COM3 is a resistive element R3X, the other side of which is connected to the VB voltage supply. Also connected to the output of the comparator COM3 is a resistive element R4X, the other side of which is connected to the positive input terminal of the comparator COM3. Also connected to the positive input terminal of the comparator COM3 is one side of a resistive element R5X and the anode of a diode DXX. The cathode of the diode DXX is connected to the other side of the resistive element R5X and to the output of the comparator COM2. Also connected to the positive input terminal of the comparator COM3 is one side of the capacitive element CXX, the other side of which is grounded. There is also provided a resistive element R1Y which is connected in series-circuit relationship with a resistive element R2Y. The common junction between the resistive element R1Y and R2Y is interconnected with the positive input terminal of a comparator COM4. The other side of the resistive element R1Y is grounded and the other side of the resistive element R2Y is connected to the VB power supply voltage. Also connected to the positive input terminal of the comparator COM4 is one side of a resistive element R4Y, the other side of which is connected to the output of the comparator COM4. Also connected to the aforementioned output of the comparator COM4 is one side of a resistive element R3Y, the other side of which is connected to the VB power supply voltage. Connected to the input terminal of the comparator COM4 is the cathode of a diode DYY, one side of a resistive element R5Y and one side of a capacitive element CYY. The other side of the capacitive element CYY is grounded, the other side of the resistive element R5Y is connected to the anode of the diode DYY and to the output of the previously mentioned comparator COM2. The output of the comparator COM3 is connected to the first input terminal of an OR gate BO. The output of the comparator COM4 is connected to the second input terminal of the aforementioned OR gate BO. Outputs of like comparators (not shown) in circuits OX2, OX3 and OX4 are interconnected in pairs to the 3-8 input terminals of the aforementioned OR gate BO. The value of the elements of the aforementioned capacitive control circuits are as depicted in Table 3.

TABLE 3

| R1X, R1Y | 56K ohms |
| --- | --- |
| R2X, R2Y | 56K ohms |
| R3X, R3Y | 22K ohms |
| R4X | 470K ohms |
| R5X, R5Y | 470K ohms |
| DXX, DYY | IN4148 |
| COM3, COM4 | LM3302 |

The eight-input OR gate BO may be of the type known as MC14048BCP. The eight-input OR gate BO will produce a digital one on the output thereof if a digital one exists on any of the eight input terminals thereof. The output of the OR gate BO goes to the clock input terminal C of a latch LA1. The data D input terminal of the latch is grounded and the set terminal S is interconnected with the previously mentioned switch RESET. The $\bar{Q}$ output terminal of the latch LA1 is connected by way of a resistive element RL1 to the base of a transistor element QL1 and to one side of a resistive element RL2, the other side of which is connected to the voltage supply VB and to the emitter of the aforementioned transistor QL1. The Q output of the latch LA1 is connected by way of a resistive element RL3 to the base of a transistor QL2, and to one side of a resistive element RL4, the other side of which is connected to the emitter of the aforementioned transistor element QL2 and to system ground. The collector of transistor element QL1 is connected to one side of a resistive element RL5, the other side of which is connected to one side of a resistive element RL6 and to the base of a transistor QL3. The emitter of the transistor QL3 as well as the other side of the resistive element RL6 is connected to system ground. The collector of the transistor element QL2 is connected to one side of a resistive element RL7, the other side of which is connected to one side of a resistive element RL8 and to the base of a transistor QL4, the emitter of which is connected to system voltage VB as is the other side of the resistive element RL8. The collector of the transistor QL3 is connected to the anode of a diode DL1, the cathode of a light emitting diode LD6 and one side of a control relay coil CRL1. The other side of the control relay coil CRL1, the cathode of the diode DL1 and one side of a resistive element RL9 are all interconnected to the collector of the transistor QL4. The other side of the resistive element RL9 is interconnected with the anode of the light emitting diode LD6. The control relay CRL1 is magnetically interconnected to actuate contacts KCRL1 which are interconnected with terminals ZZ for being utilized for useful purposes.

OPERATION OF THE SELF-CHECK FEATURE

When the clear line CLR is low, i.e. digital zero, the oscillator OSC is oscillating at a frequency of approximately 1 HZ in the preferred embodiment of the invention with a duty cycle of approximately 1 millisecond, providing alternating short digital ones and long digital zeros to the lower inputs of the exclusive OR gates EOR1-EOR4. Using the exclusive OR gate EOR1 and the circuit which follows it as an example, it can be seen that the effect of the alternating digital ones and zeros from the oscillator OSC causes an inversion thereof at the output of the exclusive OR gate EOR1. This, in turn, is fed to the circuit devices including transistor Q1, light emitting diode LED1, phototransistor PX1, AND gate A1, flip-flop FFA, inverting amplifier IAA, NOR gate NOR1, push pull amplifier PPI, field effect transistor FE1, bridge BG1 load LOAD1 and resistive element FR1, in a manner described previously. The relatively short duration of the digital 1 pulse is such that the electrical current in LOAD1 is periodically turned off once each oscillator cycle. However, the mechanical momentum of the load device is such that it is not mechanically affected by the short-term loss of electrical current. The short-term loss of electrical current caused by the oscillation of the oscillator OSC is reflected in the change of voltage across resistive element FR1. This periodically changes the output of the comparator COM2. This is because the voltage divider represented by the resistive elements RCOM1 and RCOM2 is such that the voltage change across the resistive element FR1 is reflected through the comparator COM2. In all normal situations, the output of the comparator COM3 and the output of the comparator COM4 are both zero. The same is true for like comparators in the circuits OX2, OX3 and OX4. This means that zeros are on the eight input gates of the OR gate BO. The output of the comparator COM3 will only go high if the input voltage on the positive input terminal thereof exceeds the input voltage on the negative input terminal thereof, which will occur if the capacitive element CXX is allowed to fully charge through the resistive element R5X. However, the result of the timing of the short duration pulse of the oscillator OSC is such that the voltage on the positive input terminal of the comparator COM3 will not attain the status of the voltage on the negative input terminal of the comparator COM3 before the pulse goes off again, thus quickly discharging the capacitor CXX through the diode DXX. In a like manner, the output of the comparator COM4 will remain zero as long as the fixed voltage on the positive input terminal thereof as determined by the voltage divider formed by the resistive elements R1Y and R2Y is higher than the voltage on the negative input terminal thereof. It can be seen though that as the output of the comparator COM2 goes high, it quickly charges the capacitive element CYY to a relatively high voltage, higher than the voltage on the positive input terminal thereof and consequently the output of the comparator COM4 will not switch states unless the capacitor CYY discharges through the resistive element R5Y on the next low or zero output of comparator COM2. The discharge time is so slow that this is unlikely to happen before the next positive pulse which quickly charges the capacitive element CYY again through the diode DYY. As long as the oscillations from the oscillator OSC are fed through the field effects transistor FE1 and correctly reflected in the resistive element FR1, the output of the comparators COM4 and COM3 will remain zero and the load LOAD1 will remain engaged mechanically, even though for a very short period of time during each duty cycle of the oscillator OSC, the electrical current in the load LOAD1 will be reduced to zero or some low value which in a preferred embodiment of the invention may be as low as one-tenth of the normal current of the load LOAD1. If on the other hand the load LOAD1 is off, the field effects transistor FE1 will still provide current therethrough for a very short period of time represented by the low-duty cycle of the oscillator OSC. Such time is calculated as to be insufficient to cause the contacts of the load LOAD1 to engage. However, the oscillation will be reflected in the resistive element FR1. If for any reason the oscillating pulses are not reflected through the field effects transistor FE1 for either an off-state or an on-state for the load LOAD1, one or the other of the capacitive elements CXX or CYY will become sufficiently charged to discharged respectively to cause one or the other of the controlled comparators COM3 or COM4 respectively to change state, to thus provide a digital one to an input terminal of the OR gate BO thus providing a change-of-state from a digital zero to a digital one on the output terminal thereof.

Normally, the latch LA1 is disposed in such a manner that the Q output thereof is at zero and the $\overline{Q}$ output is at a digital one. If the Q output is at zero, the transistor QL2 is turned off and consequently the transistor QL4 is turned off. If the $\overline{Q}$ bar output is one, the transistor QL1 is turned off and consequently the transistor QL3 is turned off. The load represented by the diode DL1, the light emitting diode LD6 and the control relay CRL is serially interposed between the transistor elements QL3 and QL4. Since both of these elements are off there is no power to the aforementioned load elements. However, should the status of the Q and $\overline{Q}$ outputs of the latch LA1 change so that the Q output goes to one and the $\overline{Q}$ output goes to zero as will happen when a digital one is disposed upon the clock input terminal C thereof, the transistor QL1 and the transistor QL2 will both turn on thus turning on transistors QL3 and QL4, respectively, thus providing current for the load elements. Regardless of the continued status of the output of the OR gate BO, the latch LA1 will not change state again until the reset switch RESET is engaged to place a digital one on the set S terminal thereof. When the load elements are energized, the control relay KCRL1 closes to thus provide an indication to any appropriate device including a feedback device for the microprocessor system MPS and the light emitting diode LD6 is energized indicating that a failure has taken place.

Referring to FIG. 3 of the drawings, a representative power supply PSB to be supplied by the user is depicted. Power supply PSB may have an AC voltage source interconnected at the input thereof, at the output thereof is provided the voltage VB. The voltage VB is electrically isolated from the voltage VA by the optocouplers shown in FIG. 3 and represented, for example, by the light emitting diode arrangements LEDA, LED1, LED2, LED3 and LED4.

I claim:

1. A switch system with failure indicator for controlling an electrical current to a load system which remains in a predetermined load state for a predetermined minimum time after the electrical current therefor ceases to flow and which changes load state after said minimum time unless said current is earlier reapplied, comprising:

switch means with control terminal interconnectable with said load system and a power supply for causing electrical conduction in said load system when turned on and for causing said electrical conduction to cease when turned off, said switch means having a test terminal on which exists a first voltage level when said switch means is on and a second voltage level when said switch means is off;

control means interconnected with said control terminal for causing said switch means to turn on and off as desired;

simulating means interconnected with said control terminal for providing a periodic overriding off signal of predetermined duration and period of repetition when said switch means is on, said predetermined duration being less than said minimum time;

failure detector means including capacitive means with charging path and discharging path interconnected with said test terminal, said capacitive means being interconnected with a voltage sensitive indicator means which provides a fault indication if the voltage on said capacitive means attains a predetermined voltage value, said capacitive means being charged through said charging path toward said predetermined voltage value from said test terminal when said first voltage level is on said test terminal and being discharged generally instantaneously to said test terminal when said second voltage level is on said test terminal, the time constant of said charging path relative to the period between each said periodic overriding off signal being such that said predetermined voltage value for said voltage sensitive indicator is not reached because said capacitive means is discharged each time prior thereto unless said controllable switch means does not corresponding switch off at the beginning of each said periodic off signal in which case said capacitive means will not be discharged causing said voltage value for said voltage sensitive indicator to be attained, thus causing said indicator means to indicate a failure.

2. A switch system with failure indicator for controlling an electrical current actuated load system which remains in a predetermined load state for a predetermined minimum time after the electrical current therefor ceases to flow and which changes load state after said minimum time unless said current is earlier reapplied, comprising:

switch means with control terminal interconnectable with said load system and a power supply for causing electrical conduction in said load system when turned on and for causing said electrical conduction to cease when turned off, said switch means having a test terminal on which exists a first voltage level when said switch means is on and a second voltage level when said switch means is off;

control means interconnected with said control terminal for causing said switch means to turn on and off as desired;

simulating means interconnected with said control terminal for providing a periodic overriding on signal of predetermined duration and period of repetition when said switch means is off, said predetermined duration being less than said minimum time;

failure detector means including capacitive means with charging path and discharging path interconnected with said test terminal, said capacitive means being interconnected with a voltage sensitive indicator means which provides a fault indication if the voltage on said capacitive means attains a predetermined voltage value, said capacitive means being charged through said charging path toward said predetermined voltage value from said test terminal when said first voltage level is on said test terminal and being discharged generally instantaneously to said test terminal when said second voltage level is on said test terminal, the time constant of said charging path relative to the period between each said periodic overriding on signal being such that said predetermined voltage value for said voltage sensitive indicator is not reached because said capacitive means is discharged each time prior thereto unless said controllable switch means does not correspondingly switch on at the beginning of each said periodic on signal in which case said capacitive means will not be discharged causing said voltage value for said voltage sensitive indicator to be attained, thus causing said indicator means to indicate a failure.

* * * * *